US010966044B2

(12) United States Patent
Basso et al.

(10) Patent No.: US 10,966,044 B2
(45) Date of Patent: *Mar. 30, 2021

(54) SYSTEM AND METHOD FOR PLAYING MEDIA

(71) Applicant: AT&T Intellectual Property I, L.P., Atlanta, GA (US)

(72) Inventors: Andrea Basso, Turin (IT); Zhu Liu, Marlboro, NJ (US); Bernard S. Renger, New Providence, NJ (US); Behzad Shahraray, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/812,129

(22) Filed: Nov. 14, 2017

(65) Prior Publication Data

US 2018/0077512 A1 Mar. 15, 2018

Related U.S. Application Data

(63) Continuation of application No. 14/467,507, filed on Aug. 25, 2014, now Pat. No. 9,826,329, which is a continuation of application No. 12/343,083, filed on Dec. 23, 2008, now Pat. No. 8,819,554.

(51) Int. Cl.
*G06F 3/048* (2013.01)
*H04S 7/00* (2006.01)

(52) U.S. Cl.
CPC .................................... *H04S 7/301* (2013.01)

(58) Field of Classification Search
CPC ...... G06F 17/30017; G06F 3/011; G06F 3/16; G06F 3/00; H04S 7/301
See application file for complete search history.

(56) References Cited

U.S. PATENT DOCUMENTS

| | | | | |
|---|---|---|---|---|
| 5,945,988 | A | 8/1999 | Williams et al. | |
| 6,195,572 | B1 | 2/2001 | Patterson et al. | |
| 7,571,014 | B1 | 8/2009 | Lambourne et al. | |
| 2005/0129252 | A1 | 6/2005 | Heintzman et al. | |
| 2006/0045275 | A1* | 3/2006 | Daniel ................ | G10H 1/0091 381/17 |

(Continued)

*Primary Examiner* — Rashawn N Tillery
(74) *Attorney, Agent, or Firm* — Guntin & Gust, PLC; Dana Lemoine

(57) ABSTRACT

A system, computer-implemented method, and tangible computer-readable media for media playback. The method includes receiving a request from a user to play a media asset, detecting capabilities of the playback device, detecting playback environment acoustic characteristics, optimizing media playback settings for the playback device and the playback environment characteristics, preparing the media asset for playback on the playback device, and transferring the prepared media asset to the playback device for playback. The method can further transfer optimized playback settings to the playback device. Media asset preparation can be based at least in part on the optimized playback settings. A playback profile can store environment characteristics and playback device capabilities. The method continuously detects changes in the playback environment characteristics, and optimizes media playback settings when detected changes exceed a threshold.

20 Claims, 3 Drawing Sheets

(56) References Cited

U.S. PATENT DOCUMENTS

| | | | |
|---|---|---|---|
| 2007/0022384 | A1 | 1/2007 | Abbott et al. |
| 2007/0266843 | A1 | 11/2007 | Schneider |
| 2008/0031475 | A1 | 2/2008 | Goldstein |
| 2008/0118078 | A1 | 5/2008 | Asada et al. |
| 2008/0125174 | A1 | 5/2008 | Kim |
| 2008/0228433 | A1 | 9/2008 | Meyer et al. |
| 2009/0138805 | A1 | 5/2009 | Hildreth |
| 2009/0169040 | A1 | 7/2009 | Chen et al. |
| 2009/0171715 | A1 | 7/2009 | Conley et al. |
| 2009/0172508 | A1 | 7/2009 | Karstens |
| 2009/0252346 | A1 | 10/2009 | Kuo |
| 2009/0281804 | A1 | 11/2009 | Watanabe et al. |
| 2009/0285404 | A1 | 11/2009 | Hsu et al. |
| 2011/0046952 | A1 | 2/2011 | Koshinaka |
| 2011/0064233 | A1 | 3/2011 | Van Buskirk |
| 2012/0123777 | A1 | 5/2012 | Agapi |

* cited by examiner

SYSTEM AND METHOD FOR PLAYING MEDIA

PRIORITY INFORMATION

The present application is a continuation of U.S. patent application Ser. No. 14/467,507, filed Aug. 25, 2014, which is a continuation of U.S. patent application Ser. No. 12/343,083, filed Dec. 23, 2008, now U.S. Pat. No. 8,819,554, issued Aug. 26, 2014, the content of which are incorporated herein by reference in their entirety.

BACKGROUND OF THE INVENTION

1. Field of the Invention

The present invention relates to media playback and more specifically to optimizing media playback for specific environments.

2. Introduction

High end stereo equipment and home theater systems commonly employ some kind of acoustic processing to tailor audio and media presentations to a particular space. For example, a user can establish a room profile for a Denon high-fidelity audio receiver so that the sound is perfectly clear and tuned for the acoustic characteristics of the room. Typically such a set up is time consuming and the necessary equipment is expensive. Further, the audio receiver has settings specific to one location. If the location changes, the user must re-establish settings by going through the lengthy setup again. Further, if the media changes, previously established settings may not apply to the new media. Even if the audio is tuned to a specific room for one person, someone else may not like how it sounds, so different users must each go through the audio set up process to suit their own acoustic tastes. Accordingly, what is needed in the art is an improved way to play back media based on acoustic characteristics.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for media playback. The method includes receiving a request from a user to play a media asset, detecting capabilities of the playback device, detecting playback environment acoustic characteristics, optimizing media playback settings for the playback device and the playback environment characteristics, preparing the media asset for playback on the playback device, and transferring the prepared media asset to the playback device for playback. In one aspect, the method further transfers optimized playback settings to the playback device. Media asset preparation can be based at least in part on the optimized playback settings. A playback profile can store environment characteristics and playback device capabilities. In another aspect, the method continuously detects changes in the playback environment characteristics, and optimizes media playback settings when detected changes exceed a threshold. The request can include a license for the media asset, in which case, the method authorizes the request based on the included license.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
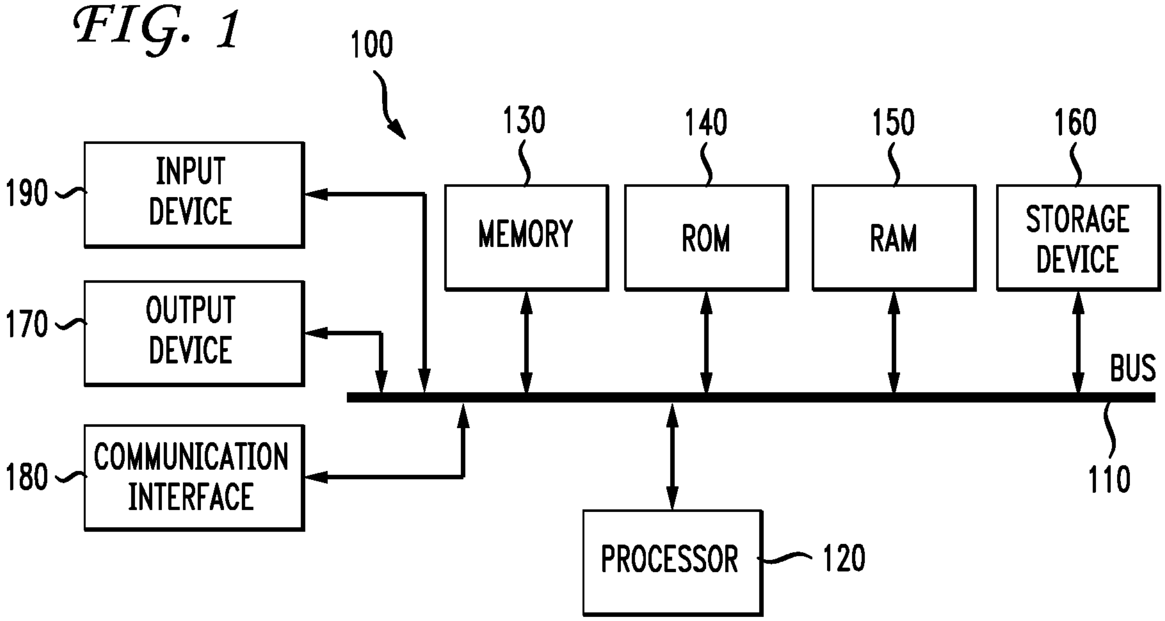
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. A STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
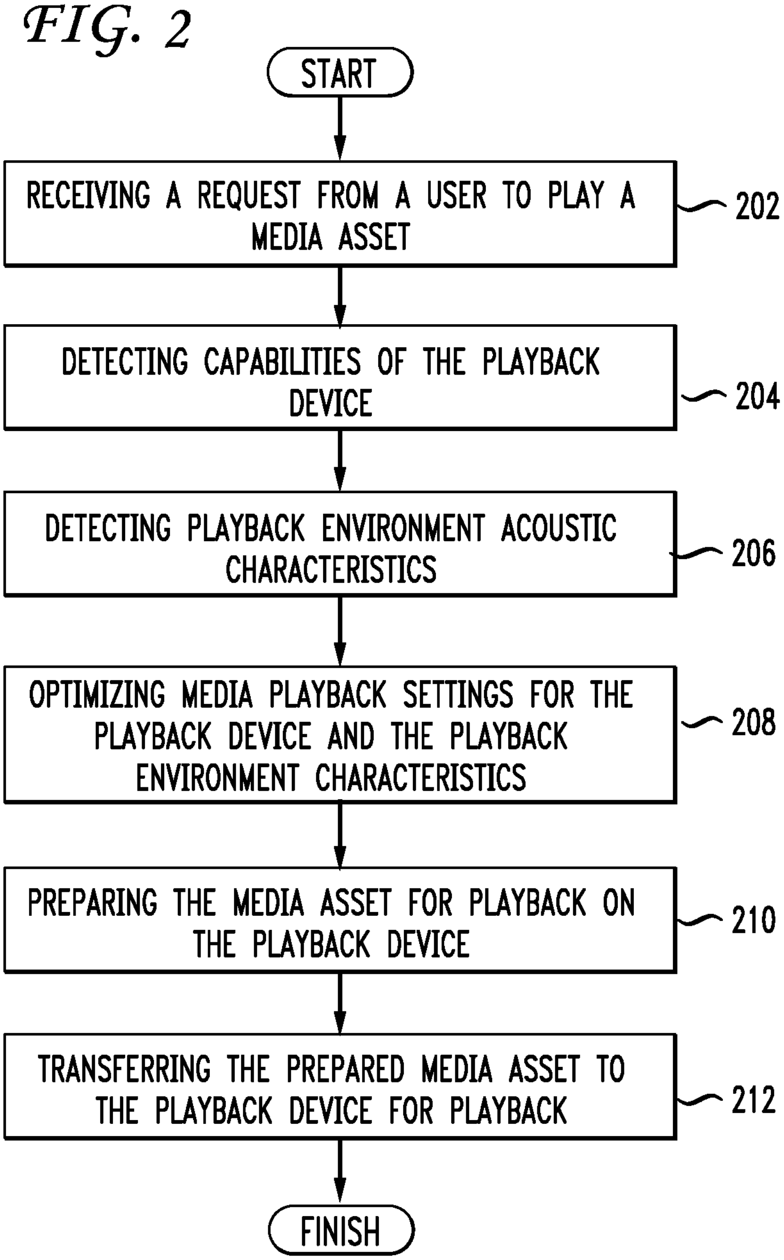
FIG. 2 illustrates an example method embodiment.

Having disclosed some fundamental system elements, the disclosure turns to the exemplary method embodiment for media playback as illustrated in FIG. 2. For simplicity, the method is discussed in terms of a system configured to practice the method. The system first receives a request from a user to play a media asset (202). The system can be local to the user or the system can be remote and network-based. The request can be a speech-based request, a selection of a media asset from a playlist, inserting some physical media, and so forth. The system detects capabilities of the playback device (204). For example, a projector may only have a single speaker and output resolution of 640×480, a television may have stereo speakers and output resolution of 1280×720, and a computer may have 5.1 surround sound and output resolution of 1920×1200. The system can directly or indirectly poll the playback device for a report on the device's characteristics. One example implementation of how to detect playback device characteristics is a Wireless Universal Resource File (WURFL), which is an XML configuration file describing device capabilities and features. The system can gather playback device capabilities in advance, index them, and retrieve the device capabilities by index when needed. The system can also detect playback device capabilities such as network speed, maximum volume, minimum volume, range, speaker type, and other characteristics.

Next, the system detects playback environment acoustic characteristics (206). In one embodiment, the system can guide the user through a detection process. In a home theater example, the system can display a calibration image and play a calibration tone on the home theater screen while the user walks from place to place with a microphone-enabled remote control or with a Smartphone, such as an Apple iPhone, to obtain measurements. The system can instruct the user to move from place to place to gather additional information. In one aspect, the system measures acoustic characteristics in an outline around the room as well as at a central location. The system can measure acoustic characteristics at each speaker. In one embodiment, the system instructs the user to take a photograph facing the interior of the room from each speaker. The system can generate a three dimensional model approximating the playback environment based on the images of the room from various locations. The system can prompt the user to enter estimated dimensions for the room as well as the type of material the walls, ceiling, and floor are made of so the system can account for their various acoustic properties properly. Based on the three dimensional model approximation, the system can calculate acoustic characteristics for how sound waves will travel and bounce in the environment.

Based on detected playback environment acoustic characteristics and on the playback device settings, the system optimizes media playback settings (208). In one aspect, the system stores environment characteristics and playback device capabilities in a playback profile and/or a media asset profile. The system can then optimize media playback based on the user profile and/or the media asset profile. The user profile can be based on user behavior or usage history. A user profile can store individual user preferences. In some cases, user preferences reflect what a user desires to hear. For instance, one user preference can be to strengthen bass audio signals or to route all bass range sounds to a particular speaker. In other cases, user preferences include user limitations. For example, the user profile of a user who is completely deaf in one ear will optimize media differently than it would for someone who is not deaf. In another example, a user is incapable of hearing sounds within a certain frequency band. The user profile can include instructions to the system to route sounds in that frequency band to appropriate surrounding frequencies so the user can hear them.

The system prepares the media asset for playback on the playback device (210). In one aspect, a central server prepares the media asset. This central server can provide a service for customers to automatically optimize media playback for any environment. The media asset preparation can be based at least in part on the optimized playback settings.

Lastly, the system transfers the prepared media asset to the playback device for playback (212). Transfers can take any form, including traditional file transfers as well as streaming media. In one aspect, the system transfers optimized playback settings to the playback device. During playback, the system can continuously detect changes in the playback environment characteristics in real time and optimize media playback settings when detected changes exceed a threshold. This aspect of the invention can be useful for portable media players, such as a portable DVD player, Smartphone, or PDA. It can also be useful for a home theater room. The acoustics in the room can be different based on different furniture configurations, number of people in the room, different doors being open or closed, whether the blinds are down or up, etc. The system can replace expensive Denon (or equivalent) sound monitoring equipment that measures phase and amplitude for each channel with a centralized service that removes complexity away from the user. The centralized service can take measurements, make calculations, correct the media asset, and send the corrected data to the playback device. Such a service or system can establish standardized descriptions of environments and devices. In a related aspect, the playback device dynamically downloads algorithms for a specific media task from the server. The server can generate device-specific algorithms that account for playback device output and processing power limitations. In one example implementation, the playback device receives playback settings using some protocol. The system transfers the content to the device for playback. The playback can include a file transfer followed by playback after the file transfer to the device is complete, or, in the case of streaming downloads, before the file transfer is complete. Regarding algorithms, the device can apply the algorithm to properly play the transferred media content or a server can apply the algorithm on the network so that the device does not need to apply the algorithm. In this way, the server can preprocess the media content and send the media in a pre-optimized form to the playback device.

In another variation, the request includes a license for the media asset and identifying the playback device and the system authorizes the request based on the included license. This variation allows a user to purchase a license for a media asset which allows the user to consume the media asset independently of media format, encoding, resolution, playback device, or even physical media. For example, the user can purchase a license to view "Wayne's World". The system can automatically transcodes and transmit "Wayne's World" to any playback device, such as a video game console, set-top box, computer, or portable media player, the user indicates in a format suitable for the playback device and optimized for the current playback environment. This feature can be implemented as part of a content delivery network (CDN) and can operate using standards such as Digital Living Network Alliance (DLNA) or Universal Plug and Play (UPNP). A license can be associated with a username/password combination, biometric ID, file, key, or some other physical object (such as a magnetically coded card or a RFID transmitter).

Figure 3:
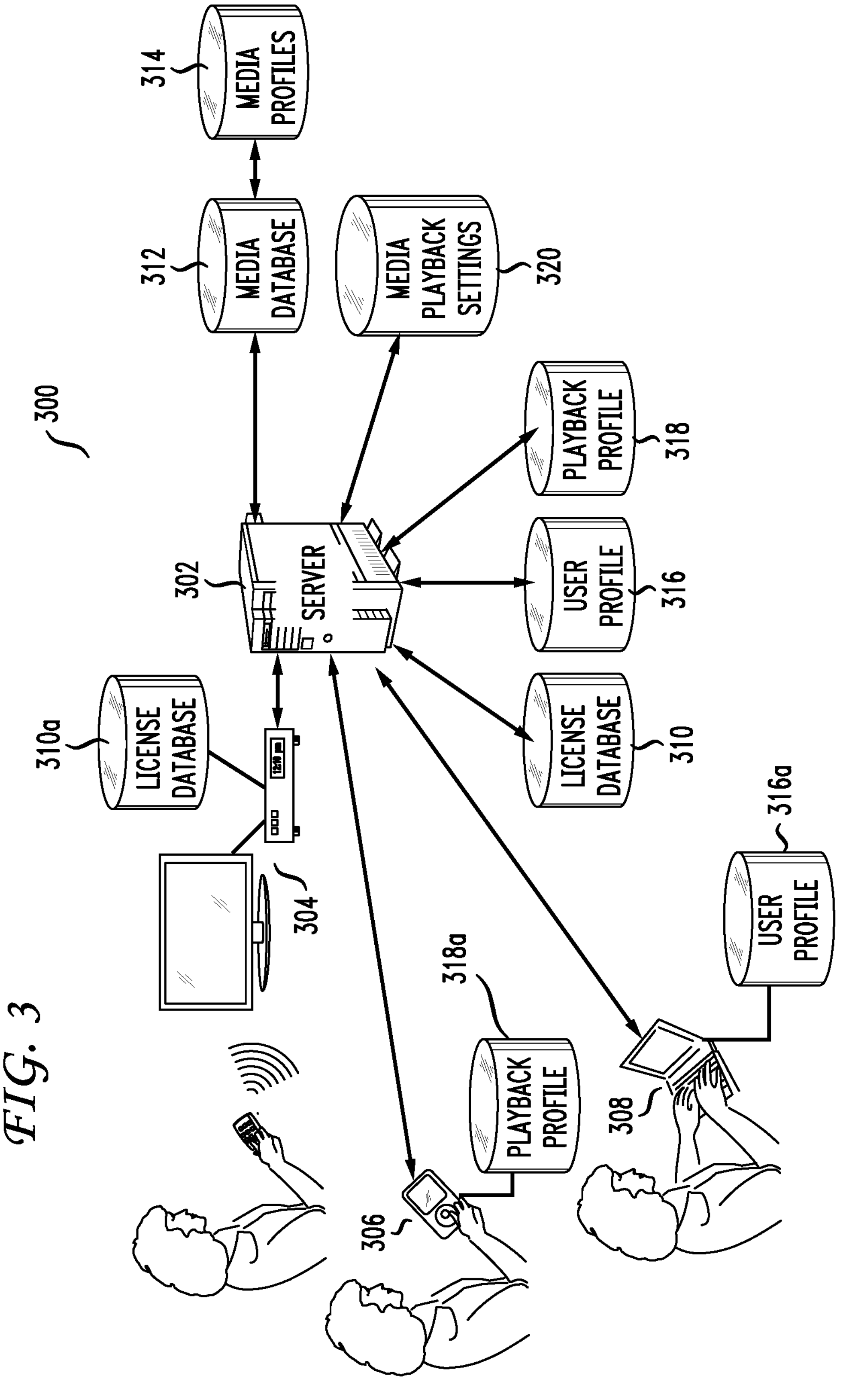
FIG. 3 illustrates an example server for playing media.

FIG. 3 illustrates an example server for playing media. The system 300 includes a server 302 which receives requests to play media from various devices such as a television set-top box 304, a portable media player 306, and a computer 308. The requests can include licenses, as discussed above. The requests can simply involve playing locally based media, but with enhanced acoustic processing. The server 302 can compare requests with licenses to a license database 310 to authorize or deny the requests. In some cases, the license database can be stored entirely or partially on a user device 310*a*. The server 302 can retrieve the requested media from a media database 312. Individual media assets in the media database 312 can contain media profiles 314 indicating suggested settings for the playback devices. The server can also retrieve a user profile 316, as discussed above, to tailor media output to a specific user's preferences. Besides a server-side user profile 316, a playback device can also contain a user profile 316*a*. Ideally, user profiles in different locations match or substantially match each other, but if they do not, the playback device or the server can merge multiple conflicting profiles. The server 302 retrieves a playback profile 318 indicating acoustic characteristics of the playback environment. If no playback profile exists for the current playback environment, the server 302 can detect some acoustic characteristics automatically. For others that can not be detected automatically, the server 302 can prompt the user through the playback device 304, 306, 308 to assist in detecting playback environment acoustic characteristics, such as walking around the environment taking measurements. Besides a server-side playback profile 318, a playback device can contain a local version of the playback profile 318*a* for offline playback. After retrieving these settings and profiles, the server 302 optimizes media and transmits the optimized media to the appropriate playback device. In one variation, the server 302 constantly or periodically monitors the acoustic environment for changes and if the changes exceed a threshold, the server optimizes the media with different settings. Further, when the server 302 combines all the various settings, the server 302 can generate media playback settings 320 for a particular media asset in a particular playback environment on a particular device for a particular user. In this way, the server 302 can quickly and easily retrieve commonly encountered settings to process media.

In one variation, the system plays media that is multisensory. For example, a typical DVD is multisensory in that it has an audio component and a video component. A multisensory recorder can store these and other senses for later playback using sensors in addition to a camera lens and a microphone. For instance, a multisensory media asset can further include smell, temperature, humidity, wind, vibration, and so forth. The multisensory recorder can even indicate if "bad" smells are detected, such as bad breath or sulfur. A multisensory recorder can store a multisensory environment for later playback or for recreating the environment in real time in another location. A multisensory recorder can allow for more intimate social interactions. For example, an Italian tourist in America can view a multisensory media stream of a bar in Italy where his friends are watching a soccer match between Italy and Russia. The multisensory media stream can include the smell of the bar, the high temperature and humidity, the background sounds of chatter and cheering, the rumble in the floor when bar patrons stomp their feet in approval at a goal, and so forth.

In one variation, the system can involve a cellular phone or smart phone which plays not only a distinctive ring tone and/or picture for each caller, but a distinctive smell tone as well. For instance, when a wife calls her husband's cell phone, the cell phone can emit the smell of the wife's perfume. The wife and/or the husband can establish that smell tone. When a hair salon calls a client's phone to remind them of an appointment, the client may not have a smell tone established. The phone can determine the type of caller, then retrieve and emit an appropriate smell tone, such as the smell of hair spray or shampoo.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to play media in a home, a car, a hotel room, or other location. Those skilled in the art will readily recognize various modifications and changes that may be made to the present invention without following the example embodiments and applications illustrated and described herein, and without departing from the true spirit and scope of the present invention.

We claim:

1. A method comprising:

receiving a plurality of images of a playback environment;

generating, based on the plurality of images of the playback environment, a three-dimensional model approximating the playback environment;

calculating, based on the three-dimensional model, acoustic characteristics of the playback environment;

adjusting a media playback setting based on the acoustic characteristics calculated based on the three-dimensional model approximating the playback environment, to yield an adjusted media playback setting; and preparing a media asset for playback on a playback device based on the adjusted media playback setting.

2. The method of claim 1, further comprising:

receiving estimated dimensions of the playback environment, and wherein the generating the three dimensional model approximating the playback environment is based at least in part on the estimated dimensions of the playback environment.

3. The method of claim 1, further comprising polling the playback device for playing capabilities of the playback device.

4. The method of claim 1, further comprising receiving an initial media playback setting from the playback device.

5. The method of claim 1, further comprising:

receiving information describing a type of wall material in the playback environment, and wherein the generating the three dimensional model approximating the playback environment is based at least in part on the information describing the type of wall material in the playback environment.

6. The method of claim 1, wherein adjusting the media playback setting is further based on a user preference, wherein the user preference accommodates a disability.

7. The method of claim 6, wherein the user preference is based on user behavior.

8. The method of claim 1, wherein adjusting the media playback setting is further based on a media asset profile.

9. The method of claim 1, wherein adjusting the media playback setting is further based on a user preference, and wherein a license for the media asset is associated with the user preference.

10. A system comprising:

a processor; and a computer-readable storage medium having instructions stored which, when executed by the processor, cause the processor to perform operations comprising:

receiving a plurality of images of a playback environment;

generating, based on the plurality of images of the playback environment, a three-dimensional model approximating the playback environment;

calculating, based on the three-dimensional model, acoustic characteristics of the playback environment;

setting a media playback setting based on the acoustic characteristics calculated based on the three-dimensional model approximating the playback environment, to yield an adjusted media playback setting; and preparing a media asset for playback on the system based on the media playback setting.

11. The system of claim 10, wherein the computer-readable storage medium has additional instructions stored which result in operations comprising:

receiving estimated dimensions of the playback environment, and wherein the generating the three dimensional model approximating the playback environment is based at least in part on the estimated dimensions of the playback environment.

12. The system of claim 10, wherein the computer-readable storage medium has additional instructions stored which result in operations comprising polling the system for playing capabilities of the system.

13. The system of claim 10, wherein the computer-readable storage medium has additional instructions stored which result in operations comprising receiving an initial media playback setting from the system.

14. The system of claim 10, wherein the computer-readable storage medium has additional instructions stored which result in operations comprising:

receiving information describing a type of wall material in the playback environment, and wherein the generating the three dimensional model approximating the playback environment is based at least in part on the information describing the type of wall material in the playback environment.

15. The system of claim 10, wherein setting the media playback setting is further based on a user preference, wherein the user preference accommodates a disability.

16. The system of claim 15, wherein the user preference is based on user behavior.

17. The system of claim 10, wherein setting the media playback setting is further based on a media asset profile.

18. A computer-readable storage device having instructions stored which, when executed by a computing device, cause the computing device to perform operations comprising:

receiving a plurality of images of a playback environment;

generating, based on the plurality of images of the playback environment, a three-dimensional model approximating the playback environment;

calculating, based on the three-dimensional model, acoustic characteristics of the playback environment;

selecting a media playback setting based on the acoustic characteristics calculated based on the three-dimensional model approximating the playback environment, to yield an adjusted media playback setting; and preparing a media asset for playback on the computing device based on the media playback setting.

19. The computer-readable storage device of claim 18, wherein the computer-readable storage device stores additional instructions stored which, when executed by the computing device, cause the computing device to perform operations further comprising:

receiving estimated dimensions of the playback environment, and wherein the generating the three dimensional model approximating the playback environment is based at least in part on the estimated dimensions of the playback environment.

20. The computer-readable storage device of claim 18, wherein the computer-readable storage device stores additional instructions stored which, when executed by the computing device, cause the computing device to perform operations further comprising:

polling the computing device for playing capabilities of the computing device.

* * * * *